United States Patent Office

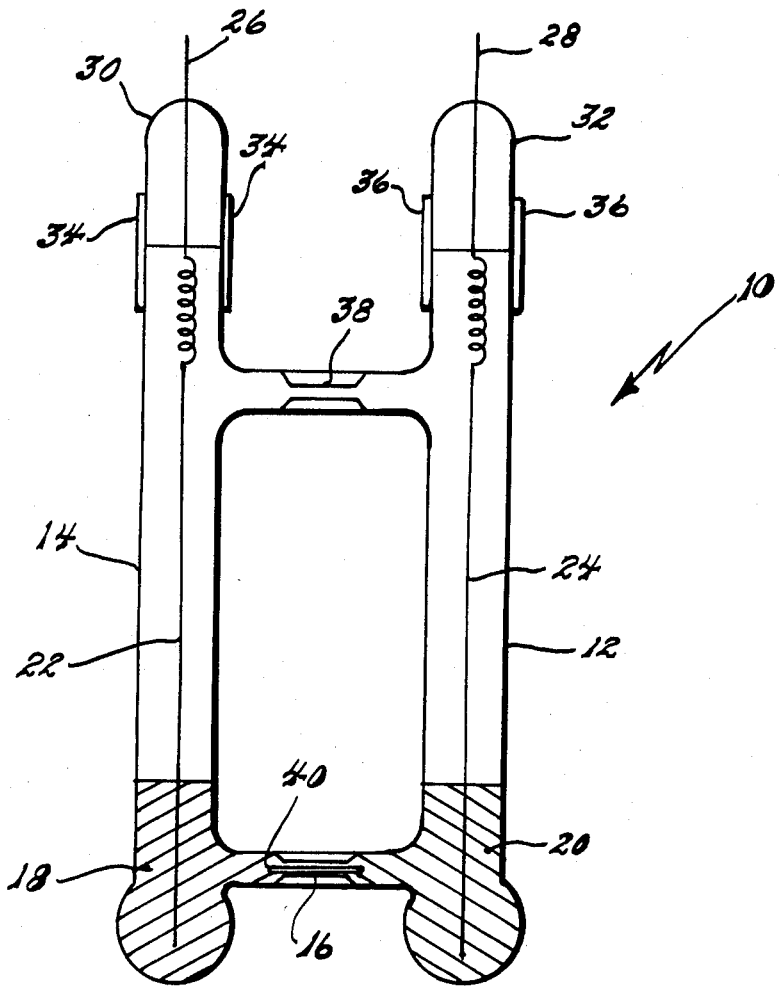

3,671,322
Patented June 20, 1972

3,671,322
ELECTROCHEMICAL CELL WITH ALUMINUM ELECTRODES AND DIFFERENT ELECTROLYTE CONCENTRATION IN TWO COMPARTMENTS
Lowell A. King and David W. Seegmiller, both of Air Force Academy, Colo. 80840
Filed Aug. 12, 1970, Ser. No. 63,224
Int. Cl. H01m 11/00
U.S. Cl. 136—83 R                                      3 Claims

ABSTRACT OF THE DISCLOSURE

An electrochemical cell of the thermal type. The cell comprises two interconnected compartments with separate aluminum electrodes positioned in each compartment. The electrodes in turn are immersed in a solid electrolytic material comprising a mixture of aluminum chloride and sodium chloride.

BACKGROUND OF THE INVENTION

This invention relates to an electrochemical cell of the thermal type. More particularly, this invention concerns itself with a thermal cell employing aluminum electrodes and a non-aqueous, fusible electrolyte.

The present interest in the operation of high altitude aircraft, missiles, and space vehicles, as well as various military operations, has created a need for light weight, maintenance free, high energy density power supplies characterized by a long shelf-life. The use of light weight power supplies in weight sensitive space vehicles, the use of backpack batteries for downed pilots and infantrymen, as well as the use of field recharging units for smaller hand carried conventional secondary batteries are examples of various applications that require a light weight power supply of the type encompassed within the scope of this invention.

A particularly attractive candidate for use as an electrode material in light weight power supplies is the metal aluminum. The metal is readily available, easily purified, inexpensive and capable of being fabricated into any reasonable shape. Consequently, a number of attempts have been made to utilize this metal as an electrode material. However, the problems of self discharge, aluminum passivation in acidic aqueous electrolytes, or aluminum corrosion in basic aqueous electrolytes have not been solved by these prior art attempts at using aluminum.

With this invention, however, it has been found that the problems of discharge, corrosion and passivation, which were encountered in previous attempts at using aluminum electrodes, have been solved by a thermal cell which comprises a container having two interconnected compartments; a fusible electrolyte mixture of aluminum chloride and sodium chloride contained in each compartment; and aluminum electrodes immersed in the electrolyte mixture.

SUMMARY OF THE INVENTION

In accordance with this invention, it has been found that a light weight, highly efficient power source can be fabricated by utilizing aluminum electrodes. The power source is a concentration type thermal cell comprising an interconnected two compartment container with an aluminum anode positioned in one compartment and an aluminum cathode positioned in the other compartment. A non-aqueous, fusible electrolyte comprising a mixture of about 50 to 75 mole percent aluminum chloride and about 50 to 25 mole percent sodium chloride is contained in each compartment in contact with the anode and cathode. The electrolyte in each compartment is similar in component content but differs in the relative concentration of aluminum chloride contained in each mixture. If each compartment contained the same relative concentration of electrolyte ingredients, then the resultant voltage of the cell would be zero. However, if the respective concentrations of aluminum chloride in each compartment is different then the cell is capable of generating electrical power. The magnitude of power or voltage produced by the cell is a direct correlation of the difference between the aluminum chloride concentrations in the electrolytes in each of the compartments.

At normal temperatures the electrolyte is solid and the cell remains inactive. Heating the cell, however, to a temperature within the range of about 125° to 180° C. renders the electrolyte molten and activates the cell. The cell is capabe of producing voltages in excess of 0.2 volt with energy densities nearly three times greater than those available from conventional lead-acid and nickel-cadmium batteries.

Accordingly, the primary object of this invention is to provide an electrochemical power source of the thermal type.

Another object of this invention is to provide a high energy electrochemical cell that utilizes metallic aluminum electrodes in combination with a fusible electrolyte.

Still another object of this invention is to provide a high energy electrochemical cell that utilizes, as its fusible electrolyte, two separate mixtures of inorganic salts that differ only in the concentration of their respective ingredients.

A further object of this invention is to provide a high energy density thermal cell that is a low current, lightweight, long lasting, and economical power source particularly characterized by a lengthy, maintenance-free shelf-life.

The above and still further objects and advantages of the present invention will become readily apparent upon consideration of the following detailed description thereof when taken in conjunction with the accompanying drawings.

DESCRIPTION OF THE DRAWINGS

In the drawing:
The figure represents a schematic illustration of the electrochemical cell of this invention.

DESCRIPTION OF PREFERRED EMBODIMENT

The electrochemical cell of this invention comprises a two compartment, interconnected container with two solid electrolytes of similar compositional content, but differing in ingredient concentration, located in each of the compartments. Aluminum electrodes are immersed in each of the electrolytes. The cell is activated by heating the electrolyte to a temperature sufficient to convert the solid electrolyte to a temperature sufficient to convert the solid electrolyte to a molten state. The difference in the relative concentration of the electrolyte ingredients in each of the compartments determines the magnitude of the voltage generated by the cell. Cell voltages in excess of 0.2 volt are obtainable with energy densities three times greater than those available from conventional batteries.

The solid electrolyte of the thermal cell of this invention comprises a mixture of about 50 to 75 mole percent aluminum chloride and 50 to 25 mole percent sodium chloride. The following table discloses two examples of specific electrolyte compositions contemplated by the invention together with an indication of their operating temperatures and the magnitude of voltage produced by using the specific electrolyte in combination with the aluminum electrodes of this invention.

TABLE I

| Cell Number | Electrolyte concentration in mole percent | | | | Temp° C. | Voltage |
|---|---|---|---|---|---|---|
| | Compartment A | | Compartment B | | | |
| | $AlCl_3$ | NaCl | $AlCl_3$ | NaCl | | |
| One | 50.9 | 49.1 | 70.7 | 29.3 | 179 | 0.230 |
| Two | 68.8 | 31.2 | 70.7 | 29.3 | 179 | 0.007 |

The solid electrolytes contemplated by the invention are rendered molten at temperatures ranging from about 125° C. to 180° C. A 60–40 ratio of $AlCl_3$ to NaCl melts at the lower temperature. Heating the cell to the appropriate temperature converts it from an inactive state to an active state with the resulting generation of electrical power.

Both the anode and cathode of the cell of this invention are fabricated from metallic aluminum. Each is separately positioned within one of the two compartments containing the electrolyte mixtures. The two compartments are interconnected such that the two electrolyte mixtures come in physical contact. Generally, a porous or wick-like material, such as asbestos fiber, is placed within the interconnecting passageway to form a porous bridge between the two electrolyte mixtures thereby providing sufficient physical contact while simultaneously preventing any undue mixing of the two electrolyte mixture concentrations.

Any suitable heating means may be employed for activating the cell. For example, electrical heating coils could be placed around the cell for controlling the operating temperature. Conventional pyrotechnic paste materials also can be employed by forming them around the cell and connecting them to an ignition source such as an electric match.

In the application of the cell of this invention to a specific battery construction, any well known conventional design configuration may be employed. As previously noted, the construction requires only a two-compartmented container for holding the two electrolyte mixtures with a means connecting the two compartments in order to provide adequate physical contact between the electrolytes.

For the purpose of illustrating a typical construction of the cell of this invention, reference is made to the accompanying drawing. In the drawing there is shown an electro-chemical cell comprising a container 10 having two separate compartments 12 and 14. A capillary sized passageway 16 connects compartments 12 and 14 for the purpose of providing physical contact between a first, solid $AlCl_3$-NaCl electrolyte mixture 18 and a second, solid $AlCl_3$-NaCl electrolyte mixture 20. Aluminum electrodes 22 and 24 are immersed in their respective electrolyte mixtures and function as the anode and cathode components of the cell. The electrodes, in turn, are connected to suitable tungsten or platinum leads 26 and 28. The leads 26 and 28, in turn, are connected to an external load, not shown, which consumes the electrical power generated by the cell. The removable top portions 30 and 31 of the compartments 12 and 14 are sealed, for example, by means of Teflon sleeve seals 34 and 36. A pressure equalizing capillary 38 interconnects the top portions of the compartments 12 and 14. The passageway 16 contains a suitable porous or wick like fibrous material 40, such as asbestos fibers, to prevent undue mixing between the contacting electrolyte mixtures 18 and 20.

The container 10 can be made of Pyrex glass or some other suitably inert material. The cell is provided with suitable heating means, not shown, for activating the cell. For example, electric coils may be used or the cell could be coated with a paste of water, filler material and a pyrotechnic agent. A mixture of zirconium and barium chromate could serve as the pyrotechnic agent. The paste would be applied wet to the surface of the cell and allowed to dry. An electric match, connected to a source of electric power, would be embedded in the pyrotechnic paste and activated by closing a suitable switching arrangement. The match would ignite the pyrotechnic material which, in turn, would generate sufficient heat to fuse the two electrolytic salt mixtures thereby activating the battery.

In the operation of the cell, using the electrolyte mixtures of Table I, it was found that the capillary 38 eliminated any detectable mass transport of melt through the asbestos fiber 40. The electrodes 22 and 24 were made from "Baker Analyzed" reagent grade 0.032 inch diameter aluminum wire. The melt in each compartment or arm of the cell was stirred with a Teflon-covered magnetic stirring bar. The cell was immersed in a conventional, well-stirred, constant temperature, silicone oil bath in order to provide adequate operating temperatures. Melt concentration ratios were changed by adding known weights of either $AlCl_3$ or NaCl to one of the arms of the cell. A new, steady cell voltage was reached once the added salt was dissolved and well mixed.

Only purified salt mixtures were utilized for the electrolyte compositions. The purification of $AlCl_3$ was accomplished by repetitive sublimation of "Baker Analyzed" reagent grade $AlCl_3$ in dry argon along the length of a 60 cm. long, 5.4 cm. O.D. Pyrex tube and finally into a receptacle which was capped with a standard taper plug. "Baker Analyzed" reagent grade NaCl was dried by fusion in air. The two chlorides were stored, handled and mixed in a glove box filled with dry air. Electrolyte compositions were fixed by weight. Waterclear, colorless, molten mixtures were obtained after being subjected to the appropriate operating temperatures. The resulting cell voltages were measured with a Leeds and Northrup K–3 potentiometer and a Leeds and Northrup Electronic D.C. Null Detector.

While the principle of this invention has been described with particularity, it should be understood that various alterations and modifications can be made without departing from the spirit of the invention, the scope of which is defined by the appended claims.

What is claimed is:

1. An electrochemical cell comprising two interconnected compartments, an aluminum electrode positioned in each of said compartments, a fusible, non-aqueous electrolyte in each of said compartments, said electrolyte consisting essentially of a mixture of about 50 to 75 mole percent aluminum chloride and about 50 to 25 mole percent sodium chloride and wherein said electrolyte in one of said compartments is characterized by an aluminum chloride concentration different from that of the electrolyte in the other compartment.

2. An electrochemical cell in accordance with claim 1 wherein the electrolyte mixture in one of said compartments consists essentially of about 50.9 mole percent aluminum chloride with the balance sodium chloride and the electrolyte mixture in the other said compartment consists essentially of about 70.7 mole percent aluminum chloride with the balance sodium chloride.

3. An electrochemical cell in accordance with claim 1 wherein the electrolyte mixture in one of said compartments consists essentially of about 68.8 mole percent aluminum chloride with the balance sodium chloride and the electrolyte mixture in the other said compartment consists essentially of about 70.7 mole percent aluminum chloride with the balance sodium chloride.

(References on following page)

References Cited

UNITED STATES PATENTS

| | | | |
|---|---|---|---|
| 3,413,151 | 11/1968 | Adams et al. | 136—83 R |
| 3,573,105 | 3/1971 | Weininger et al. | 136—153 |
| 3,492,160 | 1/1970 | Silver | 136—83 R |
| 3,441,446 | 4/1969 | Heredy | 136—83 R |

OTHER REFERENCES

Evaluation of New Cathode-Anode Couples for Secondary Batteries, T.D. Report No. ASD-TRD-62-4, April 1962, pp. 1, 24, 30.

WINSTON A. DOUGLAS, Primary Examiner

C. F. LeFEVOUR, Assistant Examiner